3,053,664
PREVENTING HAZE IN FERMENTED BEVERAGES
Ronald David Hall and Graham Harris, Redhill, England, assignors to Brewing Patents Limited, London, England, a joint-stock company of Great Britain
No Drawing. Filed Nov. 2, 1959, Ser. No. 850,055
8 Claims. (Cl. 99—48)

Fermented beverages such as beer are inherently unstable in that (i) they are prone to spoilage by micro-organisms and (ii) they form non-biological hazes, either on cooling or on standing for a period which varies from one beverage to another. The deterioration caused by the living micro-organisms can be largely eliminated by pasturisation, or sometimes by filtration, but these methods fail to prevent the formation of non-biological hazes. Often, the period required for the formation of non-biological haze is comparatively short, with the result that, for example, a beer which is clear when first bottled proves to be hazy when it reaches the consumer, to whom it is thus less attractive. In recent years, there has been a marked increase in the amount of beverages sold in bottles; this trend has accentuated the importance of so preventing or minimising the incidence of haze that the beverage remains clear for a period of time not less than the expected trade life of the product. Similar considerations apply to beverages, for example beer, sold in cans, which are frequently refrigerated and hence develop chill-hazes.

Fundamental investigations on the chemical composition of the hazes which are formed in or deposited from various fermented beverages such as beers, wines, ciders and perries, have shown them to consist essentially of proteins and/or tannins togethers with metals and other substances in small amounts. Previous attempts to prevent the formation of haze, particularly in beers, have involved (a) the degradation by means of proteolytic enzymes of the protein considered to be in part the causative agent, (b) the adsorption of unspecified haze-forming substances on carbon, silicone earths or the like, (c) the removal of the tannins regarded as essential constituents of the final haze by precipitation through the agency of polyvinylpyrrolidone, and (d) the removal of metals by means of sequestering agents, such as ethylenediamine tetraacetic acid, which themselves combine with the metals and so render the latter inaccessible to other components of the beer which would otherwise give rise to haze. However, these various measures fail to prevent in a reproducible manner the formation of haze in the beverage and they are not effective under many of the conditions normally encountered. They are, for example, largely ineffective in the presence of the relatively large amounts of air commonly encountered in cans or bottles of beverages in commercial practice. As the substantially complete elimination of air from the space above the beverage in either can or bottle is both difficult and expensive, it is desirable to devise means for inhibiting the formation of haze even in the presence of air.

In view of the fact that certain polyphenolic substances in beverages undergo ready oxidation, apparently as a necessary step in the formation of hazes, it would appear that their removal might stabilise the beverages. In seeking materials which might act as stabilising agents in this way, it was obvious that they should be non-toxic, while for practical purposes they should be insoluble. The stabilising agents should also be selective in adsorbing primarily those polyphenols which give rise to haze while substantially leaving in solution those materials which make a useful contribution to the normal flavouring of the beverage, and in the case of beer, to foam stability. It is already known that materials such as asbestos effectively remove polyphenols, for example from beer, but such adsorbents prove to be unsuitable for the present purpose in that they lack specificity in their adsorptive properties.

We have now found that the insoluble, protein-like polyamide resins, exemplified by those polyamides sold under the trade names Perlon and Nylon (see W. J. Roff, Fibres, Plastics and Rubbers, a Handbook of Common Polymers, Butterworth, London, 1956, page 72), adsorb leucoanthocyanins and various other flavanols selectively. Fundamental investigations have shown that it is these compounds in beers, derived variously from hops and from malt, which cause the formation of hazes, and that similar compounds in the raw materials for making wines, ciders, perries and vinegars also form hazes in these products.

According to the present invention, therefore, our method for preventing the formation of haze in a fermented beverage consists in removing these haze-forming compounds completely or in part from solution in the beverage by adsorption on an insoluble powdered polyamide resin, for example polyhexamethylene adipamide powder.

The most useful level of removal of the leucoanthocyanins is in the range 15 to 100% by weight, the polyamide resin used being selected so as to be capable of removing this proportion.

In some instances, the removal of the leucoanthocyanins results in improved flavour of the beverage and eliminates the necessity for cold-storage, for example of beers. Various polyamide resins may be used singly or in the form of mixtures, either with or without other adsorbents or inert bulking materials. They are, for example, effective when used in the form of powders in conjunction with existing conventional methods of filtration, for instance employing sheets of cellulose-asbestos or kieselguhr as filter-beds. The adsorptive capacity of the polyamide resins may be regenerated conveniently by washing with alkalies.

*Examples*

(1) Pale ale (5 gallons) in a conditioning tank was treated with polyhexamethylene adipamide powder (15 g.) and the powder and beer mixed by stirring occasionally during 3 days. A second batch (5 gallons) of the same beer was kept without polyhexamethylene adipamide but otherwise under identical conditions, to serve as a basis for comparison. The treated beer and the control beer were then stored at 36° F. for 14 days, filtered through Carlson sheets, bottled and pasteurised. Analysis showed that the treatment with polyhexamethylene adipamide powder had removed 15% of the leucoanthocyanins of the beer. Half of each batch of beer was bottled under conditions so arranged that each bottle contained 1 ml. of air above the beer, while the remaining half was bottled so that each bottle contained about 12 ml. of air above the beer.

Estimation by nephelometric means of the amount of haze in the beer at various times after bottling showed that the beer not treated with polyhexamethylene adipamide remained clear in presence of 12 ml. of air as above for 8 days, while in presence of 1 ml. of air it remained clear for 60 days. On the other hand, the beer treated with polyhexamethylene adipamide became visibly hazy only after 30 days in presence of 12 ml. of air, and after 100 days in presence of 1 ml. of air.

(2) Pale ale (5 gallons) was treated with polyhexamethylene adipamide powder (30 g.) and the experiment otherwise conducted as in Example 1. The treatment with polyhexamethylene adipamide in this case removed 30% of the leucoanthocyanins and extended the shelf-life in presence of 12 ml. of air per bottle from 8 days to 48 days, while in presence of 1 ml. of air per bottle it deferred the appearance of haze from 60 days to 160 days after bottling.

(3) Pale ale (5 gallons) was treated with polyhexamethylene adipamide powder (60 g.) as above. In this case 45% of the leucoanthocyanins were removed. The shelf-life was extended from 60 days to beyond 200 days in presence of 1 ml. of air, and from 8 days to 65 days in presence of 12 ml. of air.

(4) Pale ale (5 gallons) was filtered through polyhexamethylene adipamide powder (15 g.) contained in a stainless steel filter-tube bounded at each end by Carlson filter sheets clamped at their peripheries between stainless steel flanges. The filtration occupied 2.5 hours and removed 55% of the leucoanthocyanins of the beer. The bitterness and foam-stability of the original beer was unimpaired by the treatment with polyhexamethylene adipamide and the shelf-life was extended sixfold. Cooling of the treated beer to 32° F. for 18 hours failed to diminish its clarity whereas similar cooling of the untreated beer resulted in the deposition of a heavy chill-haze.

(5) Pale ale (5 gallons) was filtered through polyhexamethylene adipamide powder (30 g.) contained in a filter press. The filtration was completed in 20 minutes and removed 25% of the leucoanthocyanins of the beer. The bitterness and foam-stability of the beer remained unchanged and the shelf-life of the beer was increased threefold.

(6) Pale ale (5 gallons) fresh from conditioning tank was filtered through polyhexamethylene adipamide powder (8.5 g.) as in Example 4 and the resulting beer carbonated, filtered, bottled and pasteurised. The treatment with polyhexamethylene adipamide removed 28% of the leucoanthocyanins. A further batch of beer identical with the original beer was stored at 36° F. for 14 days and then carbonated, filtered, bottled and pasteurised. The beers were then subjected to taste-testing, whereupon no significant difference was detected.

(7) Polyhexamethylene adipamide powder (400 mg.) was saturated with the leucoanthocyanins of beer by passage of excess beer slowly through the powder. The polyhexamethylene adipamide was then washed with 0.1 N sodium hydroxide solution, and excess sodium hydroxide removed by rinsing the powder with water. The powder was then dried and an aliquot portion removed for subsequent treatment as described later. The remaining polyhexamethylene adipamide was then saturated with the leucoanthocyanins of a further fresh batch of the original beer and the processes of washing with 0.1 N sodium hydroxide and water, and removal of an aliquot part of the washed resin, followed by resaturation with leucoanthocyanins, were repeated four more times.

From each aliquot portion of washed resin removed after each washing, three samples were saturated with the leucoanthocyanins of the original beer and the amount of leucoanthocyanin adsorbed was estimated colorimetrically. The adsorptive capacity of the resin after each regeneration was thus estimated and compared with that of the original resin. Hence it was estimated that on average approximately 90% of the original capacity of the resin for leucoanthocyanins was regenerated at each treatment with sodium hydroxide.

(8) Cider (2 ml.) was shaken for 0.5 hr. with polyhexamethylene adipamide powder (0.5 g.; particle size 0.2 mm.) and the polyhexamethylene adipamide removed by filtration and washed once with water. The treated polyhexamethylene adipamide was then heated at the temperature of a boiling-water bath with a reagent (12 ml.) composed of n-butanol and concentrated hydrochloric acid in the respective proportions 5:1. After cooling, the solution was made up to 25 ml. with the butanol-hydrochloric acid reagent and the intensity of the red colour measured in a Spekker absorptiometer. This coloration was equivalent to that generated under the same conditions by the standardised leucoanthocyanin formed by reduction of taxifolin (3:5:7:3':4'-pentahydroxyflavan-4-one) at a concentration of 90 mg. per litre of solution. The filtrate from the original treatment of the cider with polyhexamethylene adipamide generated no anthocyanidin coloration on heating with acid and it was hence obvious that all the leucoanthocyanins of cider, like those of beer, could be adsorbed on polyhexamethylene adipamide powder.

(9) White wine (Bordeaux blanc; 5 ml.) was shaken with polyhexamethylene adipamide powder (0.5 g.) for 0.5 hr. and the powder filtered off. The filtrate on heating with the butanolhydrochloric acid reagent gave no anthocyanidin coloration while the polyhexamethylene adipamide powder gave a coloration corresponding to 115 mg. of leucocyanidin per litre of the original wine. It follows that all the leucoanthocyanins of wine are capable of being adsorbed by polyhexamethylene adipamide powder.

(10) Comparison of the adsorptive capacity for leucoanthocyanins of insoluble polyamide resins other than polyhexamethylene adipamide was made by saturating (a) polyglycine (b) polyglycyl-L-alanine (c) polyundecanoamide and (d) poly ε-caproamide with the leucoanthocyanins of beer. All the resins adsorbed leucoanthocyanins but polyundecanoamide was of very low capacity. The relative adsorptive capacities compared to that of polyhexamethylene adipamide were as follows:

| | |
|---|---|
| Polyglycyl-L-alanine | 0.70 |
| Polyglycine | 0.66 |
| Polyundecanoamide | 0.09 |
| Poly ε-caproamide | 1.00 |

What we claim is:

1. A method of reducing the formation of haze in a fermented beverage, in which at least one insoluble polyamide, selected from the group of polymers consisting of poly ε-caproamide, polyhexamethylene adipamide, polyglycyl-L-alanine and polyglycine, is contacted with the beverage for a time sufficient to remove at least a part of the haze-forming material.

2. A method according to claim 1, in which the polyamide is finely divided and is contacted with the beverage for up to three days at room temperature.

3. A method according to claim 1, in which the polyamide is removed from the beverage, after contact therewith, by filtration.

4. A method according to claim 3, in which the polyamide, after filtration, is washed with an alkali solution and is subsequently contacted with another batch of beverage to remove a part of the haze-forming materials.

5. A method according to claim 2, in which the polyamide is removed from the beverage, after contact therewith, by filtration.

6. A method according to claim 1, in which the beverage contains leucoanthocyanins, at least 15% of which leucoanthocyanins are removed from the beverage by the polyamide.

7. A method according to claim 1, in which the beverage is made to flow through the polyamide which is in the form of a filter bed.

8. A method according to claim 7, in which the flow of the beverage through the polyamide is interrupted, the polyamide is washed with an alkaline solution and the flow of the beverage through the polyamide is begun again.

References Cited in the file of this patent

UNITED STATES PATENTS

| | | |
|---|---|---|
| 2,086,891 | Bachmann et al. | July 13, 1937 |
| 2,472,252 | Hughes | June 7, 1949 |
| 2,688,550 | McFarlane | Sept. 7, 1954 |
| 2,811,449 | Witwer et al. | Oct. 29, 1957 |
| 2,947,633 | Perry | Aug. 2, 1960 |